(12) United States Patent
Bertagna

(10) Patent No.: US 6,384,875 B2
(45) Date of Patent: May 7, 2002

(54) VIDEO DISPLAY POSITIONING SYSTEM

(75) Inventor: Richard A. Bertagna, Bermuda Dunes, CA (US)

(73) Assignee: Transdigital Communication Corp., Brea, CA (US)

( * ) Notice: Subject to any disclaimer, the term of this patent is extended or adjusted under 35 U.S.C. 154(b) by 0 days.

(21) Appl. No.: 09/857,510

(22) Filed: Jun. 1, 2001

Related U.S. Application Data (63) Continuation of application No. PCT/US99/28659, filed on Dec. 6, 1999.
(60) Provisional application No. 60/111,061, filed on Dec. 4, 1998.

(51) Int. Cl.[7] ............................. H04N 5/645; H04N 5/64
(52) U.S. Cl. ...................... 348/825; 348/836; 345/905; 248/917
(58) Field of Search ................................. 348/825, 836, 348/837; 248/280.11, 654, 917–924; 244/112, 118.5; 361/681; 345/905

(56) References Cited

U.S. PATENT DOCUMENTS

| | | | |
|---|---|---|---|
| 5,096,271 A | | 3/1992 | Portman |
| 5,195,709 A | | 3/1993 | Yasushi |
| 5,322,025 A | | 6/1994 | Sherman et al. |
| 5,583,735 A | | 12/1996 | Pease et al. |
| 5,589,849 A | | 12/1996 | Ditzik |
| 5,743,487 A | | 4/1998 | Rice |
| 5,786,801 A | | 7/1998 | Ichise |
| 5,946,055 A | | 8/1999 | Rosen |
| 5,975,472 A | * | 11/1999 | Hung .......................... 248/921 |
| 6,181,387 B1 | * | 1/2001 | Rosen ......................... 348/837 |
| 6,186,459 B1 | * | 2/2001 | MA ............................. 248/917 |

* cited by examiner

Primary Examiner—Steven Saras
Assistant Examiner—Paul A.. Bell
(74) Attorney, Agent, or Firm—Small Larkin, LLP

(57) ABSTRACT

The present invention relates a video monitor display positioning system of the type in widespread use in passenger-aircraft entertainment systems and includes a housing in which a video screen is rotatably positioned for rotation between a retracted position and an extended position, but with rotary motion provided through a hydraulic system that includes a mechanical linkage from the screen to a linear motion to rotational motion actuator subassembly which is in turn actuated by a hydraulic system that includes a cylinder, two mutually opposed, hollowed pistons, an internal spring positioned within the cavity formed by the hollow pistons, a hydraulic circuit including a hydraulic oil reservoir, an electric motor that controls a hydraulic pump, a solenoid valve and an over pressure switch.

16 Claims, 11 Drawing Sheets

VIDEO DISPLAY POSITIONING SYSTEM

This application is a continuation of PCT/US99/28659 filed Dec. 6, 1999, and claims the benefit of U.S. 60/111,061 filed Dec. 4, 1998.

TECHNICAL FIELD

The present invention relates to a video display positioning system of the type in widespread use in passenger-aircraft entertainment systems and other systems such as may be found in ships, boats, trains, buses and other environments where a retractable video display is advantageous.

BACKGROUND ART

Video display screens, typically of the liquid-crystal type (LCD), are in widespread use in passenger-aircraft entertainment systems. These screens are usually mounted in the bottom of overhead luggage bins, or alternatively in the aircraft center-aisle ceiling or in seat-back trays. The screens are movable between a stowed or retracted position when the entertainment system is not in use, and a deployed or extended position to enable viewing by seated passengers.

Known electromechanical actuators for moving screens between stowed and deployed positions and the systems in which they are found are characterized by noisy operation, and poor reliability. These problems are an annoyance to passengers and a maintenance problem for operators of transport aircraft. These problems are essentially solved by the hydraulic screen-positioning system of the present invention.

DISCLOSURE OF INVENTION

The present invention relates to a video display positioning system in which a retractable video display is operated by use of a hydraulic-mechanical actuator and a control system which permits communication from a central control station to individual units.

Preferred embodiments of the present invention are directed to video screen positioning systems in which the operation of the screen from a retracted, unused position to an extended position for use in viewing the screen is accomplished by a hydraulic system which includes a hydraulic circuit and electric motor, a solenoid valve, a cylinder that encloses two, opposed open-ended pistons that are forced together to create linear motion in a first direction and a spring that functions as a restoring force to separate the two pistons and cause linear motion in a second, opposite direction, a linear-to-rotary motion linkage connected to the screen, and sensing and control circuitry for monitoring the position of system components pistons and to the screen and controlling operation of the system components.

BRIEF DESCRIPTION OF THE DRAWINGS

Other objects and advantages of the invention will become apparent from the foregoing detailed description taken in connection with the accompanying drawings, in which

FIG. 9 is a partial side view of the piston-cylinder actuator sub-assembly and linear-to-rotary motion linkage taken through line 9—9 of FIG. 8, and showing the system in the screen-extended position;

BEST MODE FOR CARRYING OUT THE INVENTION

Figures 1, 5, 8:
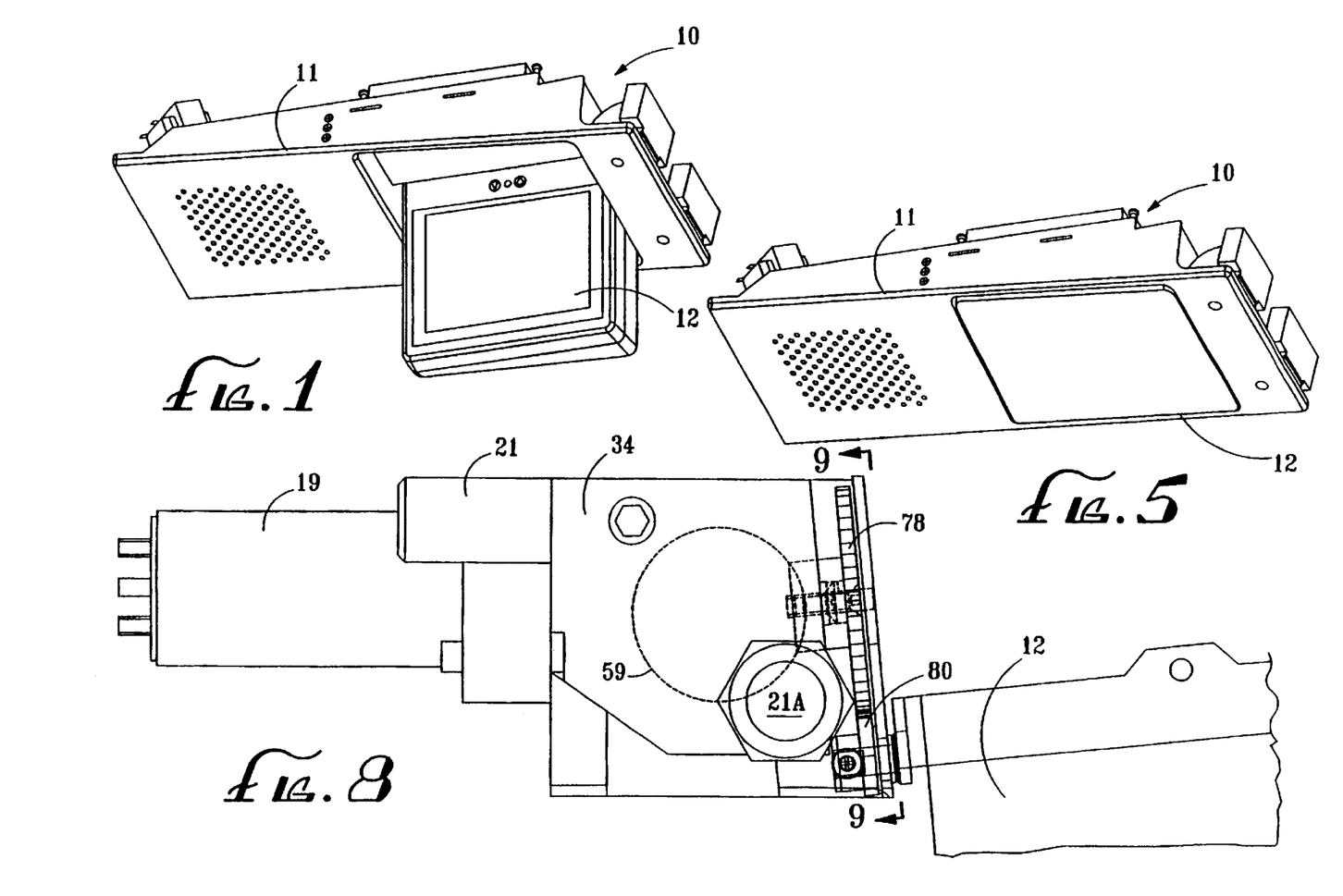
FIG. 1 is a perspective view of a preferred embodiment of the display-screen assembly of the present invention shown as suitable for mounting in an overhead luggage bin and in a screen-extended position.
FIG. 5 is perspective view of the FIG. 1 embodiment, but in a screen-stowed position.
FIG. 8 is a partial bottom view of the FIG. 6 embodiment.

FIG. 1 shows a display-screen assembly or system 10 configured for installation in the underside of an aircraft-cabin overhead luggage bin. The total number of assemblies 10 varies from application to application, with a larger aircraft having a relatively high number and a small aircraft having a relatively small number of assemblies. The assembly includes a frame 11 suitable for flush mounting to the luggage bin. A conventional LCD display screen 12, preferably of a conventional, 6.5" diagonal size, is pivotably mounted on the frame, and is shown in an extended or deployed position for viewing by passengers. The screen positioning sub-assemblies of the present invention are secured to the upper, inside of the frame so as to be out of the passenger's view during normal operation, and are coupled to each other to enable the screen to be moved between stowed and deployed positions through use of a hydraulically operated piston-cylinder actuator. In the preferred embodiment the motion is a simple rotary motion between retracted and stowed positions.

Figure 2:
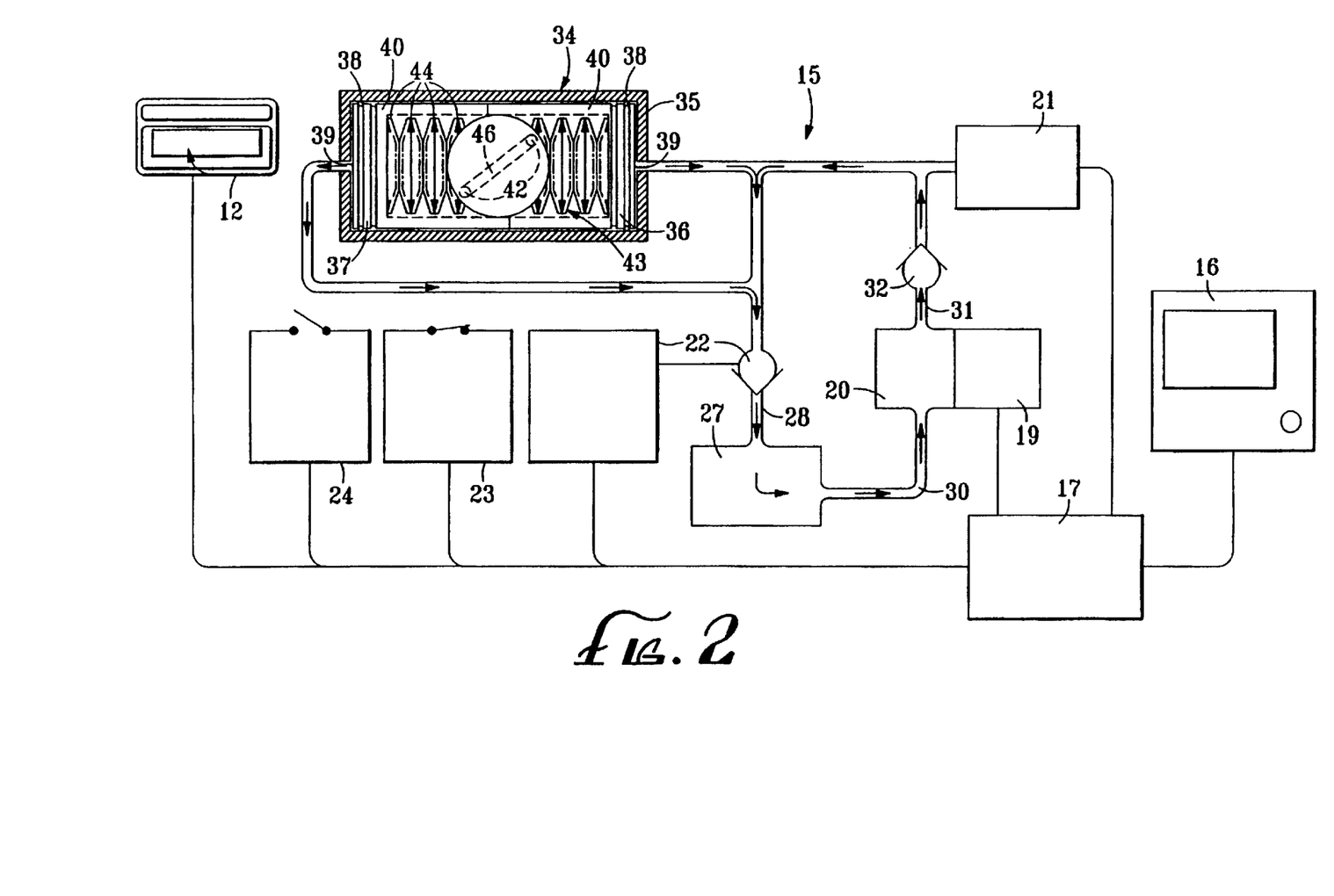
FIG. 2 is a schematic diagram of the system components of the FIG. 1 embodiment shown in a screen-stowed mode.
Figure 3:
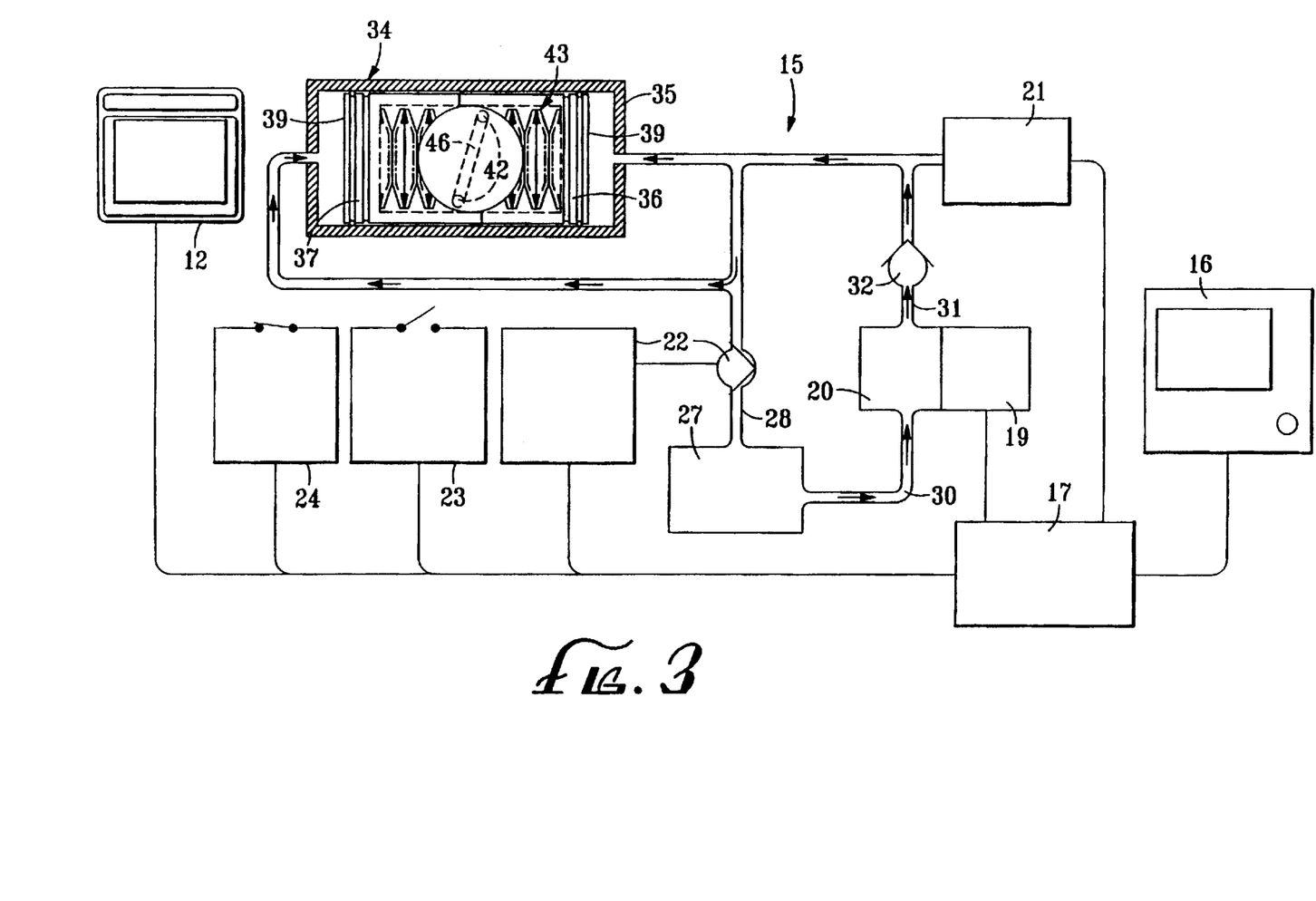
FIG. 3 is a schematic diagram similar to FIG. 2, but showing the system components in a screen-extended position.

FIG. 2 shows various of the sub-assembly components 15 of the positioning system of the present invention as configured in a hydraulic circuit when screen 12 is rotating toward a fully retracted or stowed position. FIG. 3 is a similar view of system components 15, but illustrates the configuration when the screen 12 is extended or deployed. A central or remote video-control command center 16, positioned in the aircraft, connects to each individual screen positioning assembly control circuit 17, one of which is shown in FIGS. 2 and 3. Each control circuit 17 includes, preferably, a printed circuit board, including a microprocessor positioned within each module or assembly 10. Under the control of video-control center 16, each circuit 17 applies sequenced electrical power to the electrical components of each assembly 10, and transmits video signals to each screen 12. The electrical components include a motor 19, preferably a direct current ("DC") motor, which drives a hydraulic-fluid pump 20. A pressure switch 21 for sensing hydraulic pressure above a specific value, such as about 140 psi, and a normally open solenoid valve 22 are included in the hydraulic circuit shown in FIGS. 2 and 3. A first limit switch 23, shown in the closed position (screen fully retracted) closes when the screen 12 is fully retracted, and a second limit switch 24, shown in the open position in FIG. 2, closes when the screen 12 is fully extended.

The hydraulic circuit also includes a hydraulic-fluid reservoir 27 having an inlet conduit 28 connected to the outlet or downstream side of solenoid valve 22, and an outlet conduit 30 connected to the inlet of pump 20, with the flow direction shown with arrows. The pump 20 has an outlet conduit 31 connected through a check valve 32 to pressure switch 21, to the upstream side of solenoid valve 22, and to opposite ends of a spring-biased twin piston-cylinder actuator 34. The conduits that connect the various components, as well as the components, are of conventional design. They are, however, preferably for use in aircraft and therefore must be made to conform to applicable governmental regulations. Also, they must be sized and configured to fit within the volume of the pre-existing cavity for the conventional electromechanical systems when used as replacements therefor.

Figures 4A, 4B, 4C:
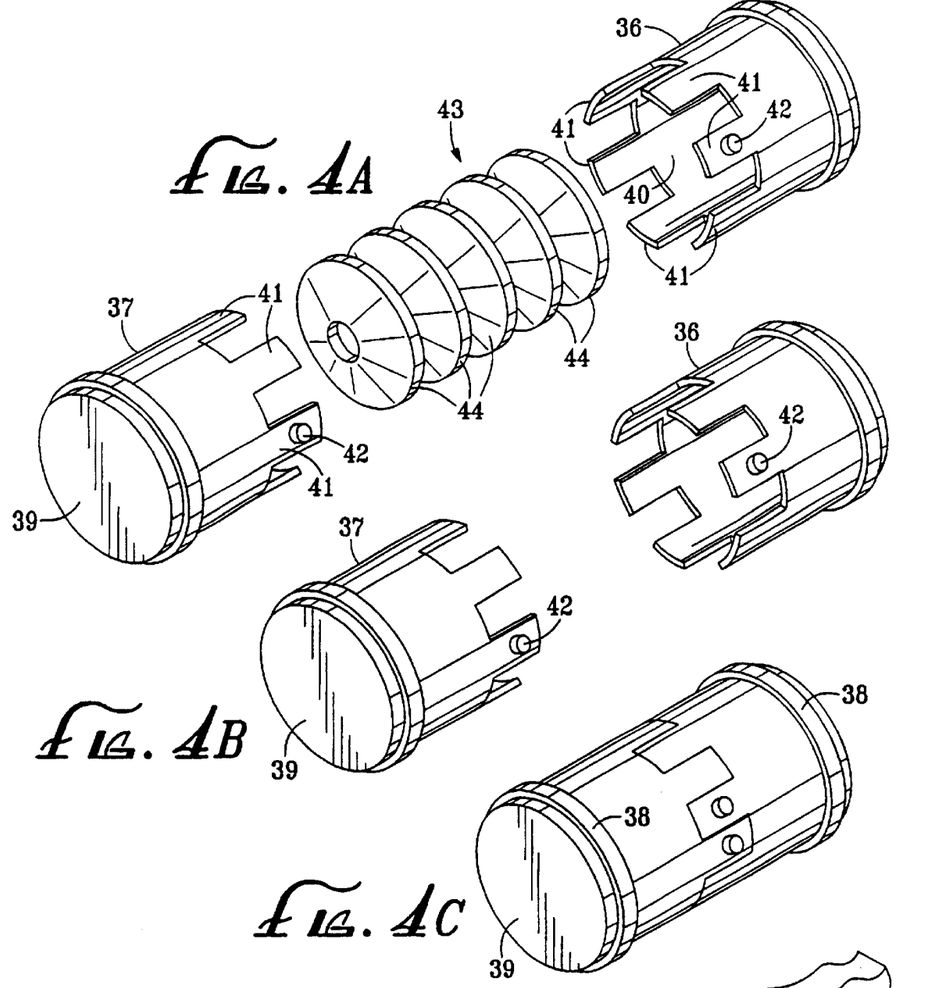
FIGS. 4A–D are sketches of the piston-cylinder actuating sub-assembly of the FIG. 1 embodiment.

Actuator 34 has a cylinder 35 having at its opposite ends interleaved pistons 36 and 37 with conventional seal rings 38. The pistons and associated components are shown and described in greater detail in FIGS. 4A–D. Each piston has a solid end face 39, from which the seal rings 38 are slightly axially spaced. Each piston also has an open end and cylindrical side walls 40 with alternating gaps and rectangular fingers or extensions 41 at their distal ends. The cylinder wall extensions of the first piston are configured to mesh with corresponding gaps in the distal end of the second piston. These pistons thus have a hollow cavity in their center. The sawteeth or segmented inner ends 41 interfit as shown in FIG. 4C. One cylinder wall segment 41 of each piston has rigidly secured thereto a short pin 42, as shown in FIG. 4B.

The pistons are biased away from each other by a conventional compression spring sub-assembly 43 fitted in the cavity formed by the two hollow pistons. In one embodiment the spring sub-assembly 43 includes a plurality of series-stacked Belleville spring washers 44. Belleville spring washers provide a relatively high restoring force (about 135 pounds when compressed, as shown in FIG. 3) with relatively small displacement. It is this restoring force which smoothly drives the screen to a stowed position when power is removed from the system, as will be described in greater detail.

Figure 4D:
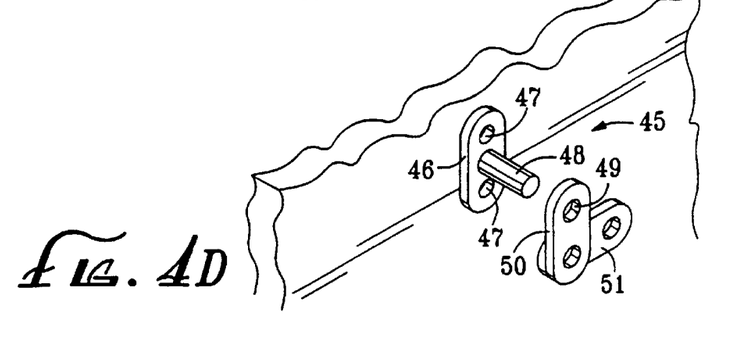

A rotary-to-linear-motion linkage or sub-assembly 45 is shown in FIG. 4D, and has a first link 46 with two holes 47 positioned in its opposite ends, each hole to receive one of the two pins 42. A third pin 48 extends in a direction perpendicular to and outwardly from the center of link 46, and is rigidly secured in hole 49 at a first end of a second link 50. The opposite or second end of link 50 is pivotally connected to a third link 51 which is in turn operatively connected to screen 12. Pins 42 and first link 46 are disposed within a laterally enlarged portion of cylinder 35, as shown in FIG. 2, and pin 48 extends outwardly through a sealed bearing for connection to the second and third links which are external to the cylinder. The links are of conventional design and made of conventional materials, and are preferably of durable, light weight such as aluminum. The two pistons, with their sawteeth cylinder wall distal ends in a meshed position are shown in FIG. 4C, corresponding to the hydraulic circuit being pressurized and the screen being extended.

During operation, when video-control center 16 activates the aircraft's entertainment system, power is applied to hydraulic-pump motor 19, and after a delay, preferably, of about 4–5 milliseconds, thus allowing the motor to overcome the initial starting torque of the pump, power is applied to solenoid valve 22 to close the valve, and to pressure switch 21. The pump 20 draws hydraulic fluid from reservoir 27, and the fluid flows through check valve 32 into both ends of cylinder 35 to establish a fluid pressure, preferably, of about 140 psi, to pistons 36 and 37. Return flow of fluid to the reservoir is blocked because solenoid valve 22 is closed.

Force exerted by the hydraulic fluid causes pistons 36 and 37 to move toward each other from the position shown in FIG. 2 to the position shown in FIG. 3, and this movement drives first link 46 counterclockwise (as viewed in FIGS. 2 and 3) to rotate pin 48, thus causing linkage assembly 45 to extend screen 12 to a deployed position for passenger viewing. Limit switch 24 is closed when the screen is fully deployed, and the switch closure is sensed by control circuit 17, which then turns off pump motor 19. Control circuit 17, however, maintains power to solenoid valve 22 and to pressure switch 21 to keep the screen deployed. Reverse flow of fluid toward the pump is prevented by now-closed check valve 32, and the established hydraulic fluid pressure exerted on the pistons 36 and 37 is maintained because the solenoid valve 22 remains energized and closed.

In the screen-deployed position, the Belleville spring washers 44 are compressed between pistons 36 and 37, and exert a restoring force which is slightly less than the force exerted by the hydraulic fluid against the piston faces 39. When the video-control center 16 commands retraction of the display screens (as, for example, when the aircraft is being prepared for landing), control circuit 17 removes power from solenoid valve 22, thus opening the valve and depressurizing the hydraulic system by permitting fluid flow into reservoir 27.

The restoring force of spring 43 then moves the piston 36 and 37 away from each other to the position shown in FIG. 2, and thus returns the screen 12 to a retracted position. Screen movement is smooth and relatively slow because it is regulated by the rate of decay of hydraulic-fluid pressure opposing the spring force. Seating of the screen 12 in a fully retracted position is sensed by a second limit switch 23 which causes control circuit 17 to remove power from the system components until the next activation signal is received.

The display-screen assembly of this invention provides several safety features which are advantageous as compared to existing electromechanical screen-deployment systems. Should there be a power failure in the cabin entertainment system, de-energized solenoid valve 22 will open, releasing hydraulic-fluid pressure, and permitting the restoring force of the compressed spring to move the screen to a stowed position.

Should the screen be manually pushed toward a closed position, or if the screen strikes someone or an object during extension or while extended, a pressure spike will result. During a pressure spike hydraulic fluid pressure will be increased above the normal level of about 140 psi, and the increased pressure will exceed a predetermined set point determined to be at some value above 140 psi, for example, about 150 psi, and when the set point pressure is exceeded will activate pressure switch 21. Actuation of switch 21 causes the control circuit to remove electrical power from the system components. This depressurizes the hydraulic circuit through now-open valve 22, and causes retraction of the screen 12 to a stowed position by the restoring force of the spring 43.

Figure 6:
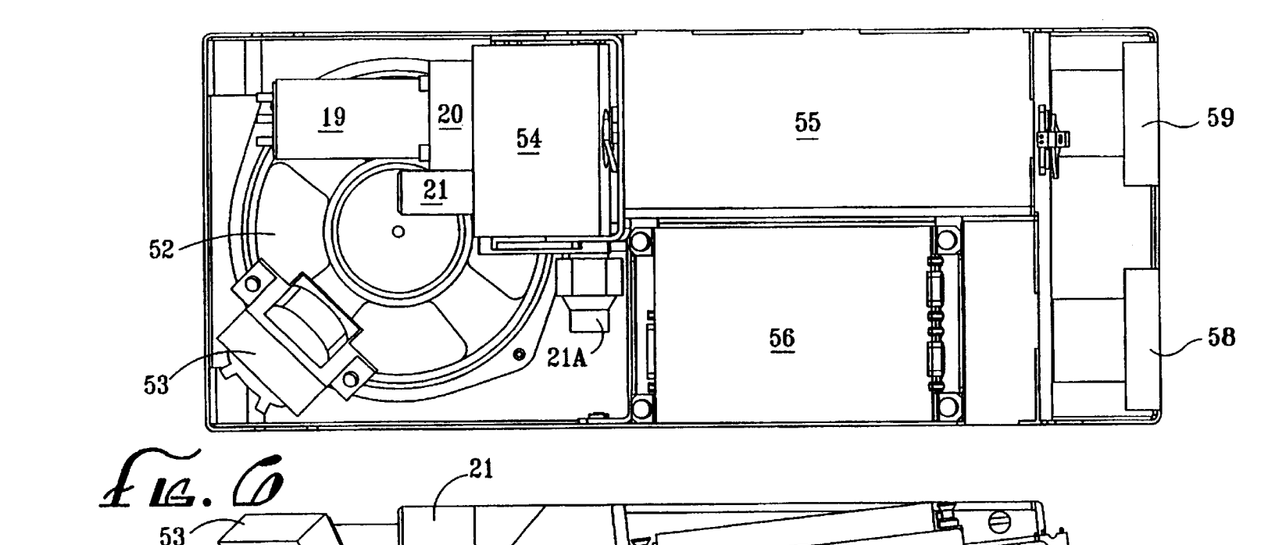
FIG. 6 is a top view of the present invention, but with a second embodiment showing the arrangements of components within the housing.
Figure 7:
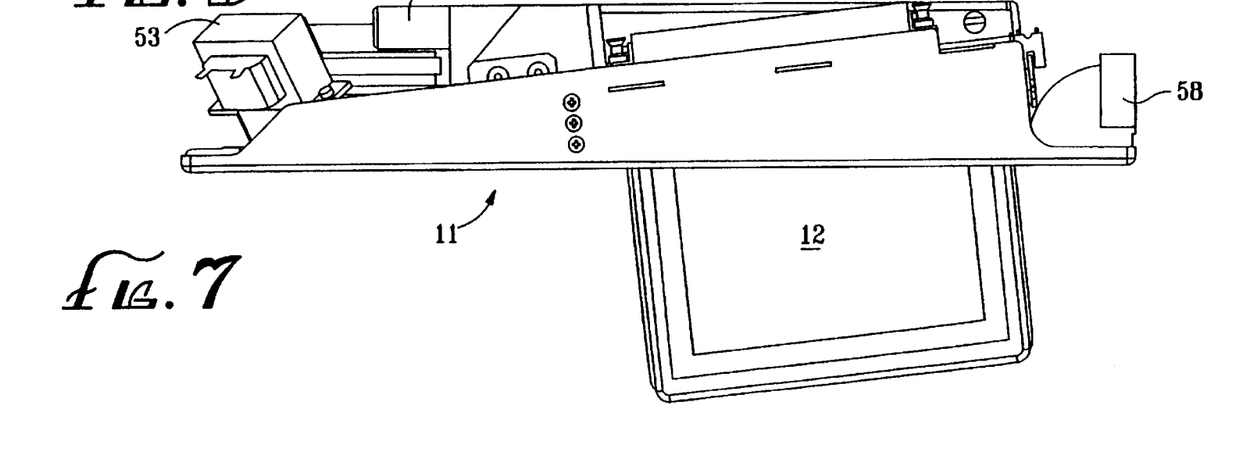
FIG. 7 is a front side view of the FIG. 6 embodiment.

FIG. 5 illustrates another preferred embodiment of assembly 10 with the screen 12 in a retracted position, with the screen 12 casing (not numbered) back side shown flush with the bottom surface of frame 11. Also, the display-screen assembly is attached to the aircraft in a conventional manner using conventional components. Referring to FIG. 6, a preferred sub-assembly positioning within the frame 11 is shown. At the left speaker 52 is mounted to the frame 11 for projection of sound into the passenger cabin. The speaker 52 is a conventional, 6 inch speaker with accompanying conventional hardware shown at 53. The hydraulic actuator including the piston-cylinder housing 54, the motor 19, the pump 20, solenoid 21 and pressure switch 21A are also shown in FIG. 6. The housing for the control circuitry 17 is shown at 55, and the back side of the screen 12 is shown at 56. Conventional hinges are shown at 58 and 59.

Figure 12:
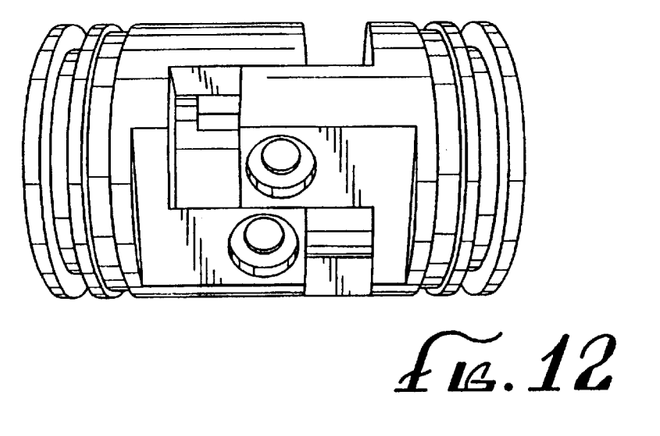
FIG. 12 is a side view of the FIG. 11 pistons, shown in a partial mating position.
Figure 13A:
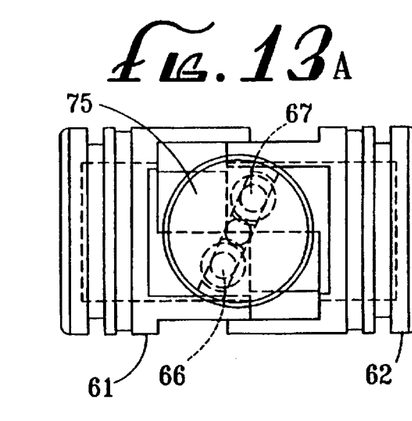
FIG. 13A is a side view of the FIG. 11 pistons, shown in a screen-extended position.
Figure 13B:
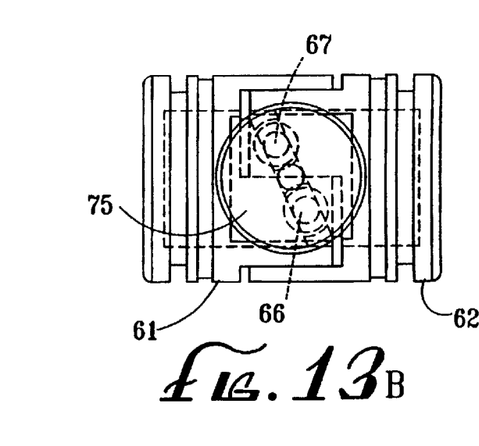
FIG. 13B is a side view of the FIG. 11 pistons, shown in a screen-stowed position.
Figures 14, 15:
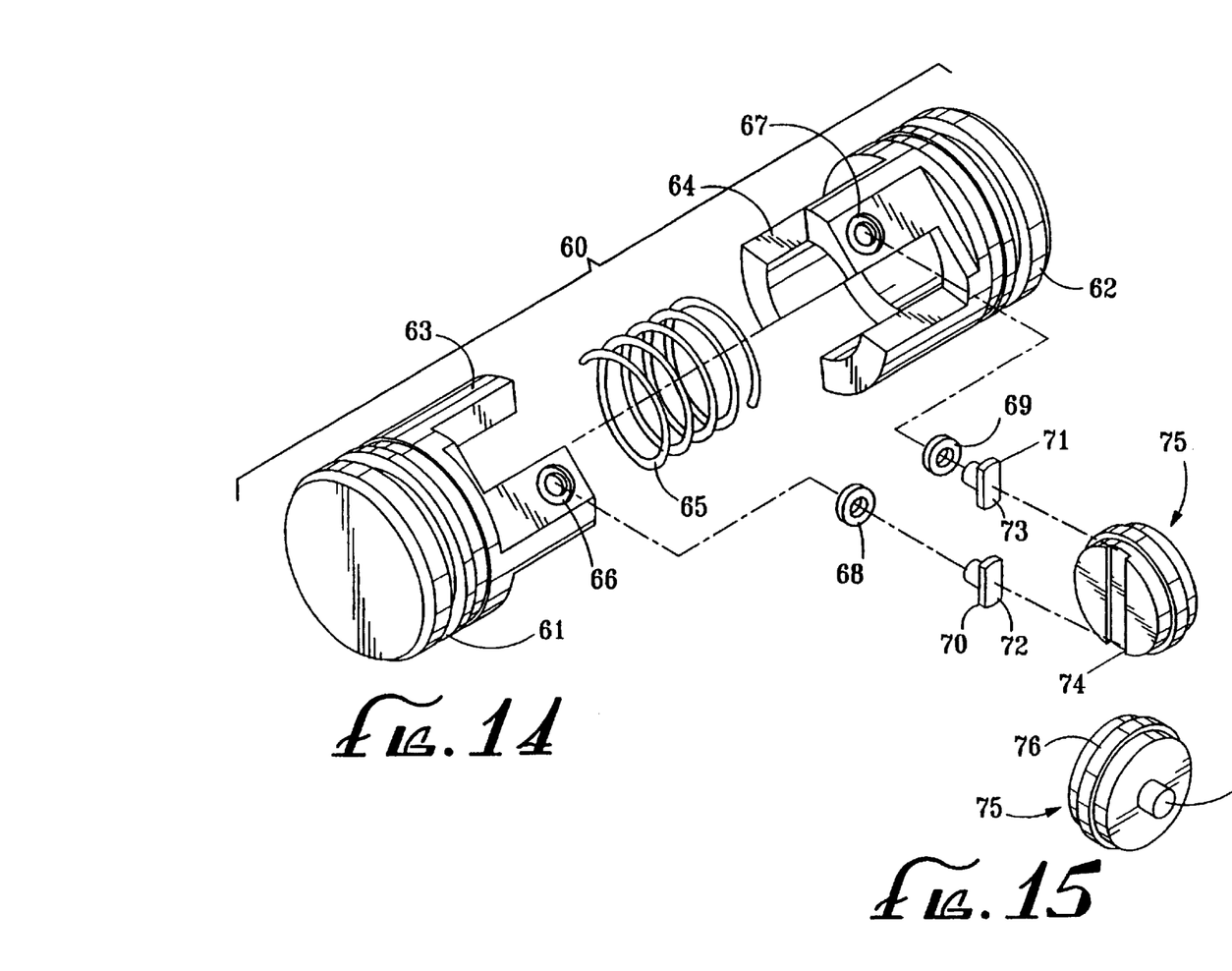
FIG. 14 is an exploded, perspective view of the two pistons and rotary-to-linear motion linkage sub-assembly of the FIG. 11 embodiment.
FIG. 15 is a side perspective view of the rotary-to-linear motion linkage sub-assembly disk of the FIG. 11 embodiment.

This alternate, and most preferred embodiment of the present invention pistons of the piston-cylinder is shown in various detail in FIGS. 5–15. With reference to FIG. 14, an alternate piston-cylinder actuator 60 includes a first piston 61 and a second piston 62, each of which includes, interleaved extensions or fingers at the distal ends of the cylindrical walls, shown at 63 and 64, respectively. A conventional coil spring 65 is positioned by the cylindrical cavity formed within the piston 61 and 62. The spring 65 is chosen to have a restoring force sufficient to force apart the piston 61 from the piston 62 when the pump is de-energized and the valve 22 is opened to return the screen 12 to a retracted position. The restoring force of the spring 65 must also be chosen to be slightly less than the force exerted by the hydraulic fluid when the hydraulic circuit is pressurized, so as to permit the piston 61 and 62 to compress the spring when the system is pressurized. The spring 65 may be of conventional spring materials and also must be chosen so as to be compatible with the hydraulic fluid used in the system. Conventional hydraulic oil approved for use in passenger aircraft in the preferred fluid for use in the present invention. Each of the pistons 61 and 62 has an orifice in one of its fingers. The orifice on piston 61 is shown at 66 and the orifice on piston 62 is shown at 67. The orifice 66 and orifice 67 receive bearings 68 and 69 respectively. Each of the bearings 68 and 69 receive a drive pin 70 and 71 as shown in FIG. 14. The drive pins 70, 71 are "T" shaped pins that have a cylindrical stem that extend through and rotate with respect to the bearings, and a generally rectangular top shown at 72, 73. The top part of each "T" 70, 71 functions as a driving surface which slides along a groove, or channel 74 positioned in one side of a hub 75. The hub 75 is a generally cylindrically shaped disc having an enlarged radius portion or band in its center. At one side of the disk the channel 74 is cut across its diameter. The channel 74 is of a width and depth sufficient to permit sliding of the pins 70 and 71 as the pistons 61, 62 are forced together by hydraulic pressure, or forced apart through operation of the spring 65. The opposite side of the disc 75 includes a cylindrical pin which in turn extends out of the cylinder and is fixed to a linkage, preferably a gear sub-assembly that in turn is operatively connected to the screen and rotates the screen from a retracted position to an extended position and vice versa. Conventional sealing techniques may be used to prevent leakage from the cylinder. The raised shoulder of the hub and the cylindrical pin of the hub 75 are illustrated at 76, and 77, respectively, in FIG. 15.

As may be observed in FIGS. 14 and 15, as hydraulic oil pressure pushes on the ends of the piston 61 and 62, the piston 61 and 62 are forced together and the drive pins move closer to the middle as the pistons come closer together, i.e., the orifice 66 and 67 come closer together and force the pins 70 and 71 to slide within the slot or channel 74. Because the channel 74 restricts motion of pins 70 and 72 to a linear motion along its length, this causes the hub 75 and its pin 77 to rotate, thus converting linear motion into rotary motion through a gear linkage.

Figure 10:
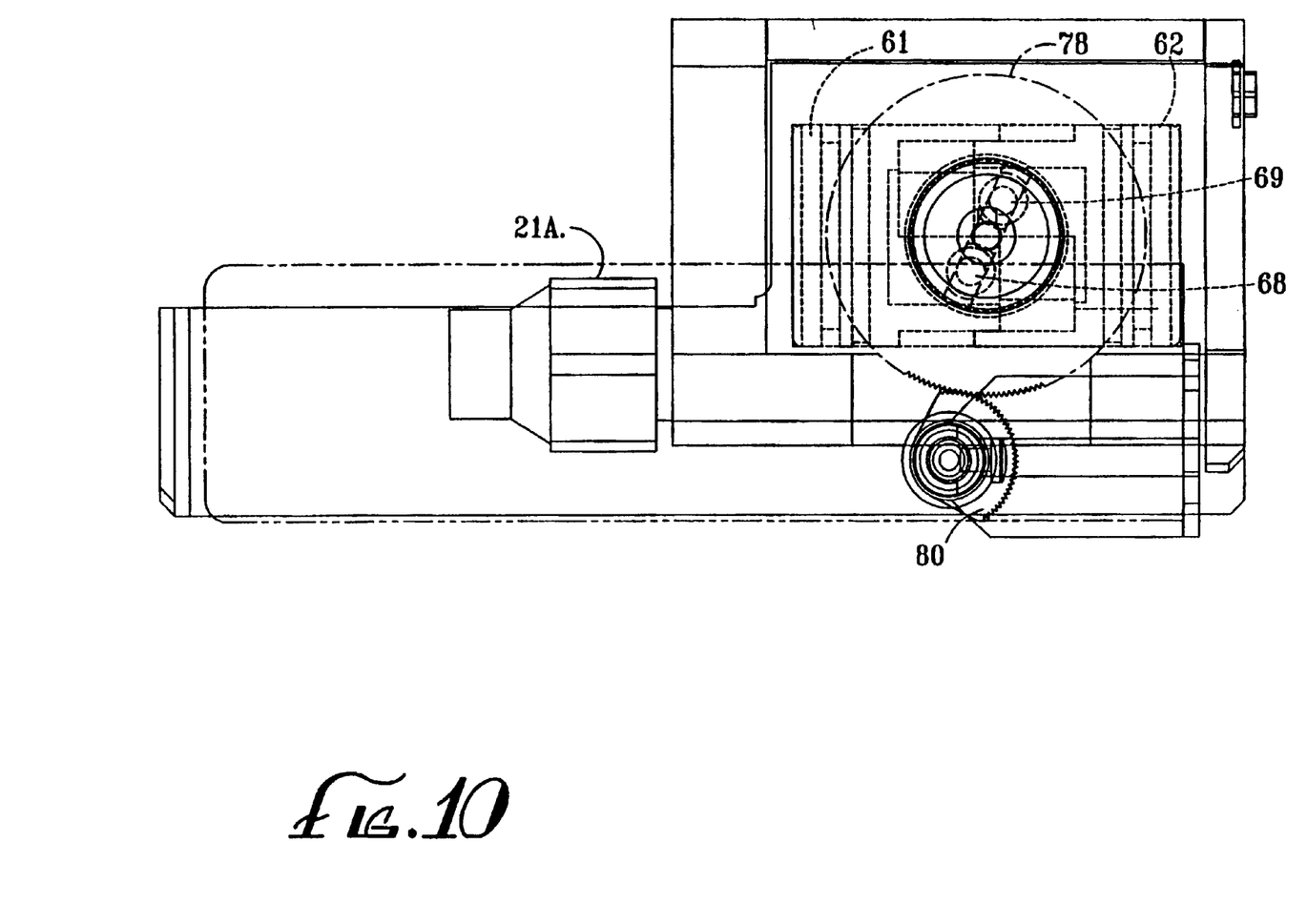
FIG. 10 is like FIG. 9, but in a screen-stowed position.

With reference to FIGS. 8 and 9, the preferred alternate embodiment actuator gear linkage is shown with a first, drive gear 78 affixed to the pin 77, and with its sawtooth portion 79 engaging the corresponding sawtooth portion of driven gear 80, which in turn causes rotation of the screen from a retracted position to an extended position and vice versa. In FIG. 9 the hydraulic actuator 60 is shown with the piston 61 and piston 62 pressed together by the hydraulic oil so that the screen is rotated to its extended position, as shown in dashed lines. FIG. 10 illustrates the same components as does FIG. 9, but in the condition when the pistons 61 and 62 have been forced apart from each other by the spring so that the screen is in a retracted position, as shown in dashed lines.

Figure 11:
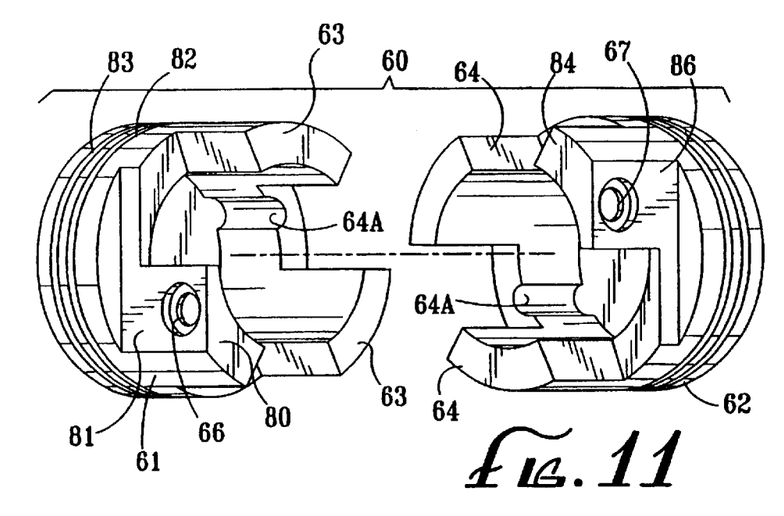
FIG. 11 is an exploded, perspective view of an alternate embodiment of the two pistons for use in the present invention.

FIGS. 11 and 12 show in greater detail the left piston 61 and the right piston 62 of the preferred embodiment actuator 60. With respect to the left piston 61, two of the distal extensions or fingers 63 have a rounded external periphery as well as a rounded internal periphery for receiving the coil spring and sliding within the cylinder housing (not shown). The third extension or finger of each piston has a flattened region 81, 86, respectively, along its radial outer periphery. Also, each piston 61, 62 has two channels 82 and 83 into which conventional seal rings may be placed. With reference to FIG. 12, it may be seen that channels 82 and 83 are of a different depth. Cylindrical scallops, or cavities 64A are positioned in the inside cylindrical walls of each piston and function as channels for flow of lubricating fluid for the Belleville washers, when such washers are used as the source of spring restoring force. Also, in comparison to the pistons of the first preferred embodiment, the length of the distal extension of each piston of the second preferred embodiment is greater in proportion to the length of the cylinder walls adjacent the solid end of the piston. FIG. 11 also illustrates piston 62 as having a structure complimentary to that of piston 61, with two of its fingers 64 having rounded internal and external peripheries and with the third finger 84 having a flattened region. The flattened regions of the two pistons provide a surface against which one face of the hub 75 rests.

As shown in FIG. 12, the piston 61 and piston 62 are positioned in a partially interleaved, or mated position so that the spatial relationship of the various fingers 63, 64, 80 and 84, as well as the orifice 66 and orifice 67 may more clearly be seen with respect to each other.

Referring to FIG. 13, the actuator 60 is shown in two side views, with the pistons in a relatively open configuration in FIG. 13A, and in a relatively closed position in FIG. 13B. As is readily apparent when comparing the position of the orifices 66 and 67 in FIG. 13A to the corresponding positions in FIG. 13B, it may be seen that upon pressurizing the hydraulic system, and forcing the piston 61 and 62 together the disc 75 rotates in a counterclockwise motion as the drive pin associated with piston 62 moves from right to left and the drive pin associated with piston 61 moves from left to right, but both drive pins remain in the channel 74 of the hub 75.

Figure 16:
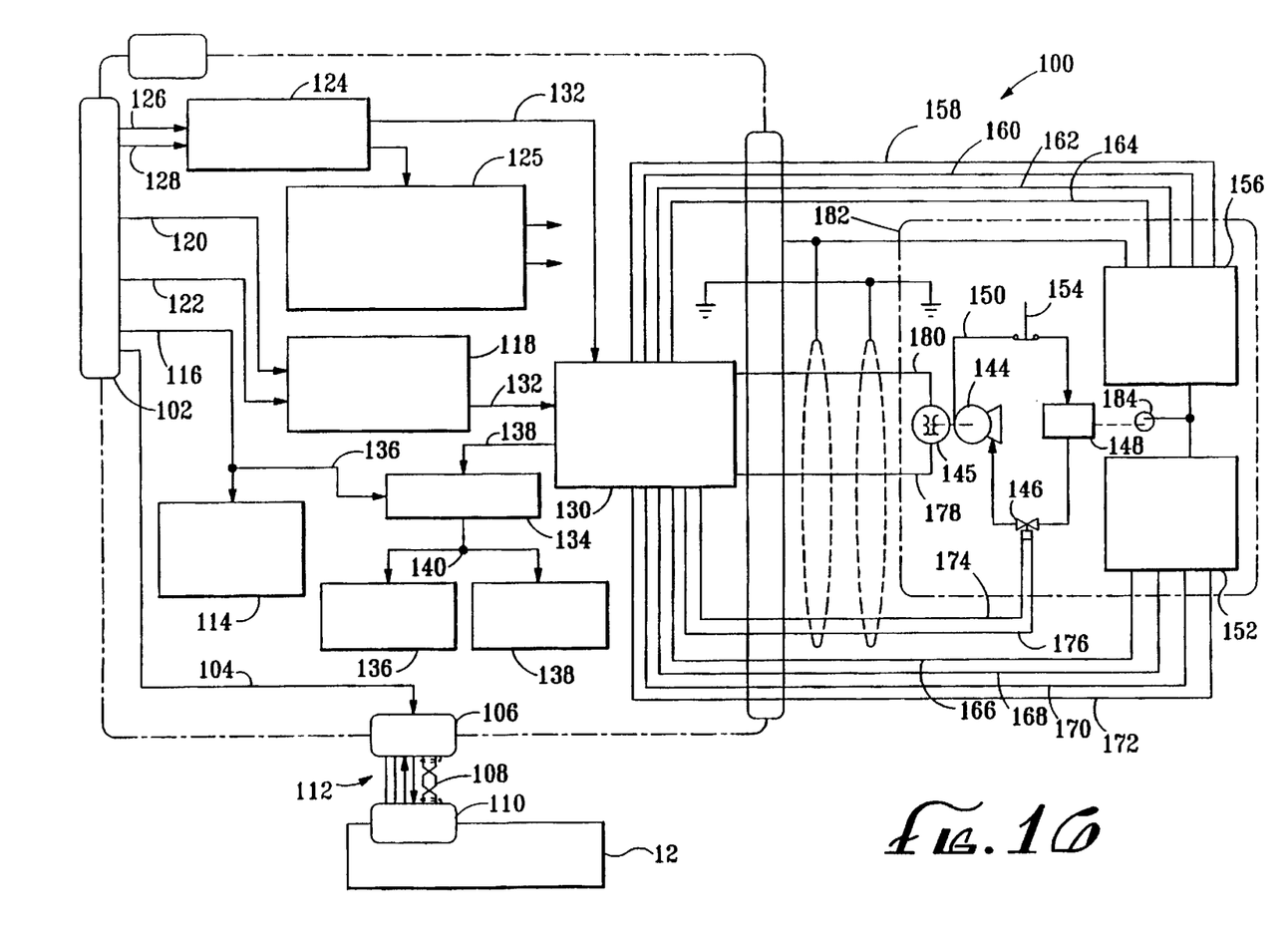
FIG. 16 is a schematic diagram of a preferred control circuit for the present invention.

With respect to FIG. 16, a control circuit 100 for the second preferred embodiment of the present invention will be described. Input power and signaling enters at junction box 102, with the video signal provided through line 104 to junction box 106 and then to the LCD video monitor 12 through line 108 and junction box 110. Conventional 18 volt DC power and conventional control signals are provided through lines shown at 112. The four lines shown at 112 may be used for 18 volt DC in, 18 volt DC return, serial data out and serial data in to the LCD screen, respectively. Lines 126 and 128 carry 48 volts DC in and 48 volts DC return. Circuit 125 includes a DC—DC converter, converts 28 to 48 volts DC input to 18 volts and 5 volts DC output. Line 120 transmits a deploy key line signal and line 122 transmits a retract key line signal. Processor 134 is a conventional microprocessor sized and programmed conventionally to communicate with the system components. Microprocessor 134 sends/receives output control signals, via lines 140 to a conventional RS45 "party line" interface to/from a host controller. In the present embodiment the microprocessor is not configured to control operation of the hydraulic circuit. Processor 134 also communicates with the LCD display via line 140 to a conventional RS 232 interface, which provides the capability of communication to individual units regarding specific unit controls such as LCD color optimization, brightness, sharpness and tint. The number of power "on" hours for the LCD backlight are monitored by the control system for purposes of planned maintenance reporting. The circuit senses a "no current draw" to the backlight within the LCD condition, and this information is transmitted, indicating a burned out backlight. Also, all display can be reset to factory settings through the RS 232 interface.

Power is also supplied to switch 114 via line 116. DIP switch 114 functions to control addressing of the module. Power and control signals are provided to conventional key line optoisolation and filtering circuit 118 via lines 120 and 122. Circuit 118 functions to isolate the extend and retract signals from all other circuitry on the circuit board. Power and control signals are supplied to power entry filtering circuit 124 via lines 126 and 128. Power is supplied to the motor/solenoid/sensor control circuit 130 via line 132 and output control signals from circuit 118 are transmitted as input to control circuit 130 via line 132. Power is supplied to the microprocessor 134 via line 136. Signals are provided to microprocessor 134 via lines shown at 138 from the control circuit 130, and from microprocessor 134 via lines 140 to the host controller and to the LCD display. Control signals are transmitted from microprocessor 134 to circuit 136 and 138 via line 140. Convention shielding, as required for aircraft, is also incorporated with the control circuit 100 and is illustrated in dashed lines (not numbered). The control circuit illustrated in FIG. 16 is preferably mounted within a quick disconnect module, using conventional connectors so that the entire circuit module is easily and quickly replaceable.

Control of the hydraulic circuit 182 is provided by key line controls and position and pressure sensors. Line 158 provides a retract emitter positive (anode) signal, line 160 transmits the retract emitter minus (cathode) signal, line 162 transmits the retract detector positive volts DC signal and line 164 is the retract detector ground line. With respect to the deployed position optical sensor 152, lines 166, 168, 170 and 172 transmit the emitter positive, emitter negative, detector positive and detector negative signals, respectively. Lines 174 and 176 transmit the solenoid positive and solenoid negative signals and lines 178 and 180 transmit the motor positive and motor negative signals. Included within the hydraulic circuit 182 are the hydraulic actuator and sensor assemblies, with pump 144, motor 145, pressure switch 154, cylinder 148, solenoid valve 146 and linear-to-rotary linkage 184 illustrated schematically.

Operation of the circuit and the associated LCD screen hydraulic positioning system is initiated when a signal is given to drop the screen(s), then electric power is turned on to the motor 145 and the solenoid valve 146. This closes the solenoid valve and hydraulic oil is pumped from pump 144 into the cylinder 148 with valve 146 shut, oil can not bleed back out as the spring exerts retract force against the ends of each piston when the motor is shut off. As shown in FIG. 16, the hydraulic fluid circuit conduits are represented by line 150.

When the screen 12 is fully extended a conventional deployed position optical sensor 152 will detect the fully extended position, and send a signal that will cut power to the motor 145 but maintain power on the solenoid valve 146 to hold the screen in the extended position. If the screen hits an obstruction on the way down, or is manually forced to close, by hitting it, the pressure switch 154 actuates and cuts power to the solenoid valve 146 thereby allowing the spring to push oil out of the cylinder and retract the screen through operation of the linkage described above. Optical sensor 156 senses when the screen has been returned to its retracted position.

Figure 17:
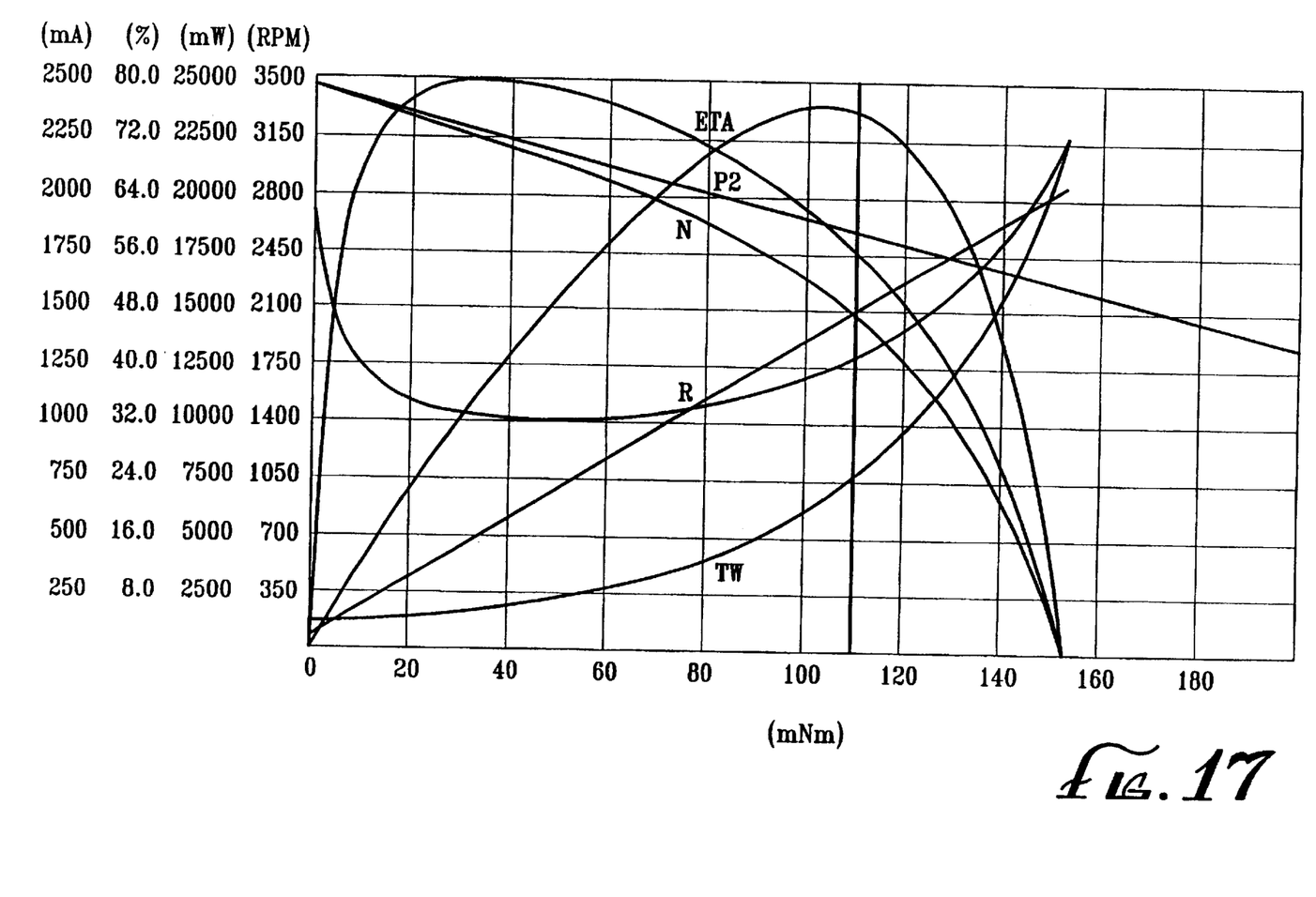
FIG. 17 is a graph of the operational characteristics of a preferred motor used in the present invention.

In the preferred embodiment for use in passenger aircraft, a preferred motor is a conventional motor available from Maxon Motor that operates on an applied voltage of 28 volts DC, at a nominal temperature of 25° centigrade. Shown in FIG. 17 are the speed/voltage and torque/current characteristics of the Maxon Motor Model 118781 (Ø35 mm 90 watt, Graphite Brush), in which speed "N" is in rpm; torque "mNm" is in mille Newton-meters; efficiency "ETA" is in percent (53.8% at 3403 rpm, 79.9% at 3133 rpm and 49.0% at 1782 rpm); resistance "R" is in Ohms (8.40 Ohm at 3403 rpm, 6.00 Ohm at 3037 rpm; power "p2" is in mille watts; and rotor temperature "TW" (26° C. at 3403 rpm, 210.2° C. at 1782 rpm). Other motors with different speeds/voltage and torque/current characteristics may be used within the context of the present invention, with the specific characteristics chosen for a specific application. For example, Maxon Motor Model No. 118778 (Ø35 mm 90 watt, Graphite Brush), has characteristics that when 18.5 volts and 9 ounce-inches of torque are applied, the motor will run at approximately 2800 rpm. If 20 volts and 15 ounce-inches of torque are applied, it will run at approximately 2800 rpm. The most preferred motor for the present invention, however, is Maxom Model 118785, which operates at 48 volts DC, because it draws less current than do the motors that operate at lower voltages.

The hydraulic electric motor also must conform to all governmental requirements for EMI and material. The electric motor must also be adapted to be powered with, preferably aircraft power at 28 volts DC or 115 volts vac 400 Hz. It is also preferred that the hydraulic cylinder be relatively small and light weight, preferably not larger than 3 inches in length or greater than one inch in diameter for the preferred usage in passenger aircraft.

The preferred solenoid valve is a conventional, normally open, solenoid valve rated at 5.4 watts of in rush power with 2 watts required to hold the valve shut. The preferred pressure switch is a conventional pressure switch, SPDT M.C. SAMP rated at 270 psi trip (rising). The preferred limit switch is a fold down, normally open or normally closed switch. When the motor is started, approximately 0.25 to 0.5 seconds later the solenoid is energized to 5.4 watts. At the full extended position, the limit switch is tripped, the motor is shut off and the solenoid is held shut, at a reduced voltage, as long as the screen is displayed. When the pressure spikes occur, due to a blocked extension of the screen or manual retract, the pressure switch opens, the current to the motor and to the solenoid is shut off and the screen retracts due to the internal spring forcing the pistons open.

Also, it is preferred that the control system be configured so that a retract command must be given to reset the over-pressure latch before an extend command will be recognized in the case that the over pressure switch opens and the screen retracts. In the present embodiment it is envisioned that reverse polarity protection is provided through conventional circuitry but that no fuse protection incorporated. Specific board layout, connecting wire descriptions, junction box locations and configurations are within the skill of the art in this field and are chose so that the system will work for its intended purpose of positioning the screen hydraulically within the principle of the invention and in the specific application chosen.

For the preferred system in which a 6 inch diagonal screen is used, approximately 96 inch-ounces of torque at the actuator shaft is required to hold the screen in a down position. The remaining components of the system are designed so that at least this amount of torque can be applied and that these components will fit within the housing and the housing in turn will fit within the predetermined volume of the aircraft bin. It is normally desired, and is preferred in the present invention to provide torque available on the order of 3 times that required so that this system will be stable even under vibration conditions.

In an alternate embodiment, envisioned for a 10 inch diagonal screen, approximately 300 inch-ounces of torque would be required to hold the screen in the extended position. In this case the components must be scaled to provide at least that amount of torque, with, preferably the same safety margin of approximately a factor of 3.

In the preferred embodiment of the present invention, the system is sized and configured so as to fit within the predetermined volume of the retractable screen mechanism bin currently existing in commercial passenger aircraft. For other applications, where the bin size and screen size has not been so determined, other configurations may be used. For example, in other applications where a larger screen may be desired, sufficient power must be generated to extend and retract the larger screen, with its greater weight. Other components of the system must be scaled up accordingly to accommodate a larger screen. Alternatively, it is envisioned that some applications may use a smaller screen, in which case the system components may be scaled down to use up less space, but provide sufficient power to extend and retract the screen.

Although the linkages shown above to convert linear to rotary motion are preferred, any conventional linkage may be employed to operatively connect the drive hub to the screen so that the screen rotates from a closed or retracted position to an extended position.

Also, the hydraulic system must be of sufficient strength and durability to operate without leaking fluid from sea level to an altitude of 12,000 feet, and must be able to cycle, preferably, at a minimum of 100,000 cycles moving the static load of 10 pounds, without failure. The hydraulic fluid also, preferably, meets or exceeds all appropriate manufacturer and governmental specifications for flammability, toxicity and corrosion for use in aircraft.

Although the present invention is envisioned for use primarily in passenger aircraft, it may also be used in other environments such as buses, recreational vehicles, vans, ships, boats, trains and related vehicles as a video display. Also, although the preferred embodiment is sized and configured for a conventional LCD screen having a diameter of approximately 6 inches, the units may be scaled up or down for positioning screens of different sizes, and the screens may be used as computer monitor in applications where a retractable screen is useful.

There has been described above a display-screen positioning system which is self-contained, and highly reliable in operation. Hydraulic force enables smooth screen extension and retraction, and automatic retraction occurs in the event of a power failure or interference with free movement or bumping of the screen.

It is understood that the above-described preferred embodiments examples, and figures are simply illustrative of the general principals of the present invention. Other formulations, arrangements, assemblies and materials may be used by those skilled in this art and which embody the principals of the present invention, which is limited only by the scope and spirit of the claims set forth below.

What is claimed is:

1. A video display positioning system comprising:
    a screen rotatably positioned within a housing;
    an electro-hydraulic actuator adapted to move the screen from a normally retracted position to an extended position;
    the actuator including:
        a cylinder having a first hydraulic fluid inlet at a first end of the cylinder and a second hydraulic fluid inlet at a second end of the cylinder;
        a first piston positioned within the cylinder and having a closed end adjacent the first fluid inlet and an open distal end that is open toward the center of the cylinder;
        a second piston positioned within the cylinder and having a closed end adjacent the second fluid inlet and an open distal end that is open toward the center of the cylinder.

2. The system of claim 1 wherein
    the distal end of the first piston comprises a series of peaks and valleys; and
    the distal end of the second piston comprises a series of peaks and valleys.

3. The system of claim 2 wherein the peaks of the first piston distal end compliment the valleys of the second piston distal end and the peaks of the second distal end compliment the valleys of the first piston distal end.

4. The system of claim 1 further comprising:
    a hydraulic circuit that includes a source of hydraulic fluid, a pump, a solenoid valve, a hydraulic piston-cylinder and conduits operatively connecting the hydraulic circuit components;
    a linear-to-rotary motion linkage operatively connected to the piston-cylinder and to the screen; and
    a motor operatively connected to the pump.

5. The system of claim 4 further including a control circuit adapted to control operation of the motor and the solenoid valve.

6. The system of claim 5 further including an over pressure switch adapted to sense pressure in the hydraulic circuit and to cause the solenoid valve to open upon pressure in the hydraulic circuit exceeding a predetermined value.

7. The system of claim 1 further including a source of restoring force adapted to cause the screen to return from its extended position to its retracted position.

8. The system of claim 1 further including a spring positioned within the cavity formed by the first piston and the second piston.

9. The system of claim 8 wherein the spring is a coil spring.

10. The system of claim 1 further comprising:
   a first mechanical link operatively connected to the first piston;
   a second mechanical link operatively connected to the second piston; and
   a third mechanical link operatively connected to the first and to the second links whereby linear motion caused by reciprocation of the first and second piston results.

11. The system of claim 10 further including:
   a drive gear attached to the third link;
   a driven gear operatively attached to the screen and to the drive gear whereby rotation of the drive gear causes rotation of the screen.

12. The system of claim 1 further including:
   peaks and valleys circumferentially extending around and at the distal ends of the pistons, which peaks and valleys of the each piston conform to the opposed peaks and valleys of the opposed piston so that upon pressurizing the hydraulic circuit the two pistons a forced toward each other with the peaks and valleys of the two pistons placed in an interleaved relationship.

13. The system of claim 1 further comprising:
   a pressure sensor adapted to sense hydraulic oil pressure in the system above a predetermined pressure and to cause return of the screen to its retracted position upon sensing a pressure in the system above the predetermined pressure.

14. The system of claim 1 further including a control circuit contained within a module and having connections adapted to relatively quickly connect and/or disconnect said control circuit module to said housing.

15. The system of claim 1 further including a control circuit adapted to monitor the length of time of power supply to the backlight of the screen display.

16. The system of claim 15 of wherein the control circuit is further adapted to sense and to indicate the absence of power to said backlight.

* * * * *